United States Patent Office 2,908,712
Patented Oct. 13, 1959

2,908,712
HEXACHLOROCYCLOPENTADIENE ADDUCT WITH N,N'-METHYLENEBIS ACRYLAMIDE

Carleton W. Roberts, Midland, and Daniel H. Haigh, Beaverton, Mich., assignors to The Dow Chemical Company, Midland, Mich., a corporation of Delaware No Drawing. Application August 22, 1958
Serial No. 756,528

2 Claims. (Cl. 260—557)

This invention concerns a new and useful hexachlorocyclopentadiene adduct and relates more particularly to the N,N'-methylenebis (1,4,5,6,7,7 - hexachlorobicyclo [2.2.1]-hept-5-ene-2-carboxamide) which may be represented by the following formula:

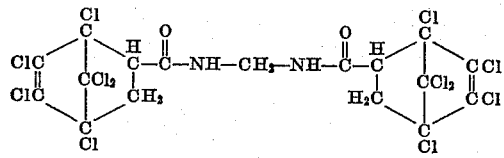

The new compound is a white crystalline material melting at 271–275° C.

The compound is compatible with resinous polymers of esters of methacrylic acid, e.g. polymethyl methacrylate, and is useful as an agent for imparting fire resistant and flame-proofing characteristics to the resins.

The new compound can be prepared by the Diels-Alder diene synthesis. The reaction can be carried out by reacting hexachlorocyclopentadiene as the diene with N,N'-methylenebis acrylamide as the dienophile to obtain the adduct product. Stoichiometric amounts of the reactants, i.e. one gram molecular proportion of the N,N'-methylenebis acrylamide per two gram molecular proportions of the hexachlorocyclopentadiene, are usually employed. The reaction is advantageously carried out in an organic solvent for the reactants such as benzene, toluene, xylene, ethyl alcohol, isopropyl alcohol, or n-heptane, the boiling of which serves to control the reaction temperature. The reaction is usually carried out at temperatures between 60° and 150° C. and at atmospheric pressure or thereabout.

In practice the hexachlorocyclopentadiene, together with an organic solvent as diluent and reaction medium, e.g. n-heptane or toluene, is placed in a reaction vessel. The mixture is stirred and heated to a refluxing temperature. Thereafter the N,N'-methylenebis acrylamide is added in the desired proportion, suitably in small portions or as a solution in an organic solvent such as n-heptane and at a rate such that the reaction can readily be controlled. The reaction which occurs readily is usually complete in from 1 to 24 hours, suitably in from 2 to 8 hours. The product can be recovered in usual ways. A suitable procedure for recovering the product is to cool the reacted mixture in an ice bath, thereby crystallizing the product, and separate the crystalline material by filtering. An alternative procedure is to separate a portion of the solvent from the reacted mixture by distillation, then cool the residue and recover the crystalline product.

In the following examples, Example 1 describes in detail the preparation of the new compound and Example 2 illustrates a utility for the new compound as a flame-proofing agent for polymethyl methacrylate resins.

Example 1

A charge of 271 grams (1 mole) of hexachlorocyclopentadiene and 200 ml. of toluene was placed in a glass reaction vessel equipped with a reflux condenser and stirrer. The mixture was stirred and heated to a refluxing temperature. Thereafter, a solution of 77 grams (0.5 mole) of N,N'-methylenebis acrylamide dissolved in 700 ml. of toluene was added over a period of about 2 hours. The resulting mixture was stirred and maintained at a refluxing temperature for a period of 20 hours, then was cooled in an ice bath. A crystalline precipitate separated from the liquid. The crystalline material was separated by filtering. It was recrystallized from methyl alcohol. There was obtained N,N'-methylenebis(1,4,5, 6,7,7 - hexachlorobicyclo [2.2.1] - hept - 5 - ene-2-carboxamide) as white crystals melting at 271°–275° C. The product was analyzed.

|   | Found | Theoretical |
|---|---|---|
| C | 29.07 | 29.18 |
| H | 1.34 | 1.54 |
| O | 5.02 | 4.47 |
| N | 3.99 | 4.00 |
| Cl | 60.58 | 60.81 |

The compound N,N'-methylenebis(1,4,5,6,7,7-hexachlorobicyclo [2.2.1]-hept-5-ene-2-carboxamide) is a new compound having the structural formula:

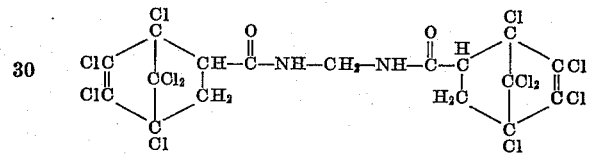

The compound is compatible with resinous polymers of esters of methacrylic acid, e.g. polymethyl methacrylate, and is useful as a fire-retarding and flame-proofing agent for incorporating with such polymers.

Example 2

A purpose of this example is to show a utility for the N,N'-methylenebis(1,4,5,6,7,7-hexachlorobicyclo [2.2.1]-hept - 5 - ene - 2 - carboxamide) as a fire-retardant and flame-proofing agent for polymethyl methacrylate.

A charge of 75 parts by weight of a resinous homopolymer of methyl methacrylate and 25 parts by weight of the N,N'-methylenebis(1,4,5,6,7,7-hexachlorobicyclo [2.2.1]-hept-5-ene-2-carboxamide) melting at 271–275° C. prepared in Example 1, was milled on a pair of laboratory compounding rolls at a temperature of 190° C. for a time of 6 minutes, then was removed, cooled and ground to a granular form suitable for molding. Portions of the composition were injection molded at a temperature of 450° F. and 12,000 pounds per square inch ram pressure to form test bars. These test bars were used to determine a flammability characteristic for the composition employing procedure similar to that described in ASTM D757–49. For purpose of comparison molded test bars of the polymethyl methacrylate were prepared and tested in similar manner. The properties determined for the compositions were as follows:

|   | A | B |
|---|---|---|
| Polymethyl Methacrylate_____percent__ | 100 | 75 |
| Adduct_____do____ | None | 25 |
| Tensile Strength_____pounds per square inch__ | 13,800 | 10,540 |
| Elongation_____percent__ | 1.0 | 3.6 |
| Impact Strength_____foot-pounds__ | 0.26 | 0.25 |
| Heat Distortion Temperature_____° C.__ | 98 | 91 |
| Flammability_____ | Burns | Self-Extinguishing |

We claim:
1. The compound, N,N'-methylenebis(1,4,5,6,7,7-hexachlorobicyclo [2.2.1] hept-5-ene-2-carboxamide).
2. A method of making N,N'-methylenebis(1,4,5,6,7,7-hexachlorobicyclo [2.2.1] hept-5-ene-2-carboxamide) which comprises reacting hexachlorocyclopentadiene with N,N'-methylenebis acrylamide in proportions corresponding to one gram molecular proportion of N,N'-methylenebis acrylamide per two gram molecular proportions of the hexachloropentadiene at reaction temperatures between 60° and 150° C.

References Cited in the file of this patent

UNITED STATES PATENTS

| | | |
|---|---|---|
| 2,758,918 | Soloway et al. | Aug. 14, 1956 |
| 2,872,483 | Bloch | Feb. 3, 1959 |